United States Patent [19]

Worthington, deceased et al.

[11] 4,290,719

[45] Sep. 22, 1981

[54] CUTTING GUIDE

[76] Inventors: Ronald L. Worthington, deceased, late of Selah, Wash.; by Florence Worthington, administratrix, 603½ B, N. 20th Ave., Yakima, Wash. 98902

[21] Appl. No.: 59,061

[22] Filed: Jul. 19, 1979

[51] Int. Cl.³ .............................................. B23C 1/20
[52] U.S. Cl. .............................. 409/180; 144/134 D; 144/136 C; 409/182
[58] Field of Search ................ 409/182, 241, 180; 144/136 C, 134 D; 83/745

[56] References Cited

U.S. PATENT DOCUMENTS

| | | | |
|---|---|---|---|
| 2,311,215 | 2/1943 | Duffy | 409/241 X |
| 2,705,032 | 3/1955 | Pearson | 144/136 C |
| 2,756,785 | 7/1956 | Godfrey | 144/134 D |
| 3,389,724 | 6/1968 | Paul | 83/745 X |
| 3,757,628 | 9/1973 | Camacho | 83/745 |
| 3,869,951 | 3/1975 | Litwin | 83/745 |
| 3,981,226 | 9/1976 | White | 409/182 X |
| 4,016,649 | 4/1977 | Kloster | 83/745 |
| 4,044,805 | 8/1977 | Gronholz | 409/182 X |
| 4,112,987 | 9/1978 | Pachnik | 83/745 X |

*Primary Examiner*—William R. Briggs
*Attorney, Agent, or Firm*—Graybeal & Uhlir

[57] ABSTRACT

A cutting guide for cutting plastic laminate material is used in conjunction with a conventional router. The cutting guide includes an elongate, flat base plate having an opening in one end portion thereof for receiving the bit of the router which has been mounted thereabove. An elongate guide fence is disposed transversely below the base plate and is mounted on a sliding carriage for movement toward and away the router cutting tool. An upwardly biased support roller is axled on the horizontal leg of an L-shaped axle to make rolling contact with a strip being cut from a larger sheet of material along a line parallel to the length of the fence. An auxiliary roller is axled to the trailing end portion of the fence to support the edge portion of the strip of material opposite the cutting tool.

11 Claims, 7 Drawing Figures

CUTTING GUIDE

BACKGROUND OF THE INVENTION

1. Field of the Invention

This invention relates to a cutting guide, and more particularly to an apparatus to be used in conjunction with a power tool to quickly, safely and accurately cut strips from larger sheets of material, such as plastic laminate, while simultaneously supporting the cut strip.

2. Description of the Prior Art

Various types of portable tools have been used in an attempt to quickly and accurately cut strips from the larger sheets of material. The success of these attempts has been at least partially related to the particular material being cut. For instance, portable, powered circular saws are commonly used to cut wood, plywood, sheet rock, and other soft materials, but have not been successful in cutting tougher, more brittle materials such as plastic laminate.

One type of tool used to cut plastic laminate is basically composed of an arcuate blade which extends forwardly from one end of a wooden handle. A sharp carbide tip is welded or otherwise affixed to the end of the blade opposite the handle. The tip is used to score a line in the plastic laminate so that it can be fractured along the line in a manner similar to cutting glass with a glass cutter.

Another type of plastic laminate cutting tool generally resembles a right angled drive mechanism attached to a powered hand drill. A cutter is connected to the output shaft of the right hand drive mechanism. This particular tool not only does not have any provision for guiding the cutting tool relative to the material being cut, but also lacks any provision for vertically supporting the strip after it is cut.

Another type of tool used to cut plastic laminate material into strips includes a conventional router having a circular base plate with a central opening through which the cutting tool downwardly extends. The router may include a short fence which is supported laterally from the base by a pair of parallel, horizontally disposed circular rods which slidably engage through openings provided in the fence and in the router base plate. A router, even with the addition of such a fence, provides no means for supporting the cut strip upwardly against the bottom of the router base to prevent the material from vibrating with respect to the cutting tool. As a result, the kerf cut in the plastic laminate is often crooked and jagged.

Furthermore, if relatively wide strips are being cut, no provision is made for holding the strip upwardly in contact with the fence to thus prevent the laminate from breaking under the weight of the portion of the strip already cut. In an attempt to prevent the strip from breaking and excessively vibrating, the user usually tries to support the strip upwardly against a router base plate by placing his fingers beneath the plastic laminate material. Manually holding the plastic laminate material in this manner is very dangerous especially since the cutting tool is not only very sharp, but also rotates in excess of 25,000 revolutions per minute.

SUMMARY OF THE INVENTION

The present invention relates to a novel, portable cutting guide especially useful in conjunction with power tools, such as a router, for cutting strips from larger sheets of various types of tough, brittle materials, such as plastic laminate. In basic form, the cutting guide is comprised of a manually graspable, elongate, flat base plate having an opening in one end portion for receiving a powered cutting tool downwardly therein. Fasteners extend upwardly through the base plate to mount the cutting tool to the top surface of said base plate. A carriage is disposed below the base plate and is guided for movement along the length of the base plate. An elongate fence is disposed transversely of the length of the base plate and mounted on the edge portion of the carriage facing the tool receiving opening to thereby move toward and away from the powered cutting tool. The fence has an upright guide face which slides along the edge of the sheet of material as it is being cut.

The present invention also includes a support roller disposed below the base plate at a location behind and to the side of the tool receiving opening towards the fence. The support roller serves to hold the strip cut from the larger sheet of material against vibration relative to the cutting tool to thereby produce a cleaner, more accurate cut. The support roller is mounted on the horizontal leg of an L-shaped axle adjacent the location at which the horizontal leg intersects with a shorter vertical leg which extends upwardly through a vertical opening provided in the base plate at a location behind and aligned with the tool receiving opening. From the lower end of the vertical leg, the horizontal leg extends beneath and longitudinally along the length of the base plate along a line substantially perpendicularly to the length of the fence. The free end of the axle horizontal leg is slidably supported by the carriage.

It is a principal object of the present invention to provide a cutting guide for accurately, safely and quickly cutting strips from the larger sheets of various types and thicknesses of materials.

It is another object of the present invention to provide a cutting guide which can be used in conjunction with various power tools and particularly with routers.

A further object of the present invention is to provide a cutting guide which is inexpensive to manufacture but rugged enough to withstand rough treatment.

An additional object of the present invention is to provide a cutting guide which will not scratch or mar the finish of the sheets of material being cut.

One more object of the present invention is to provide a cutting guide which is constructed from easily replaceable components for economic repair.

Still another object of the present invention is to provide a cutting guide which is portable, lightweight and easily handled by one person.

DESCRIPTION OF THE PREFERRED EMBODIMENT

Figure 1:
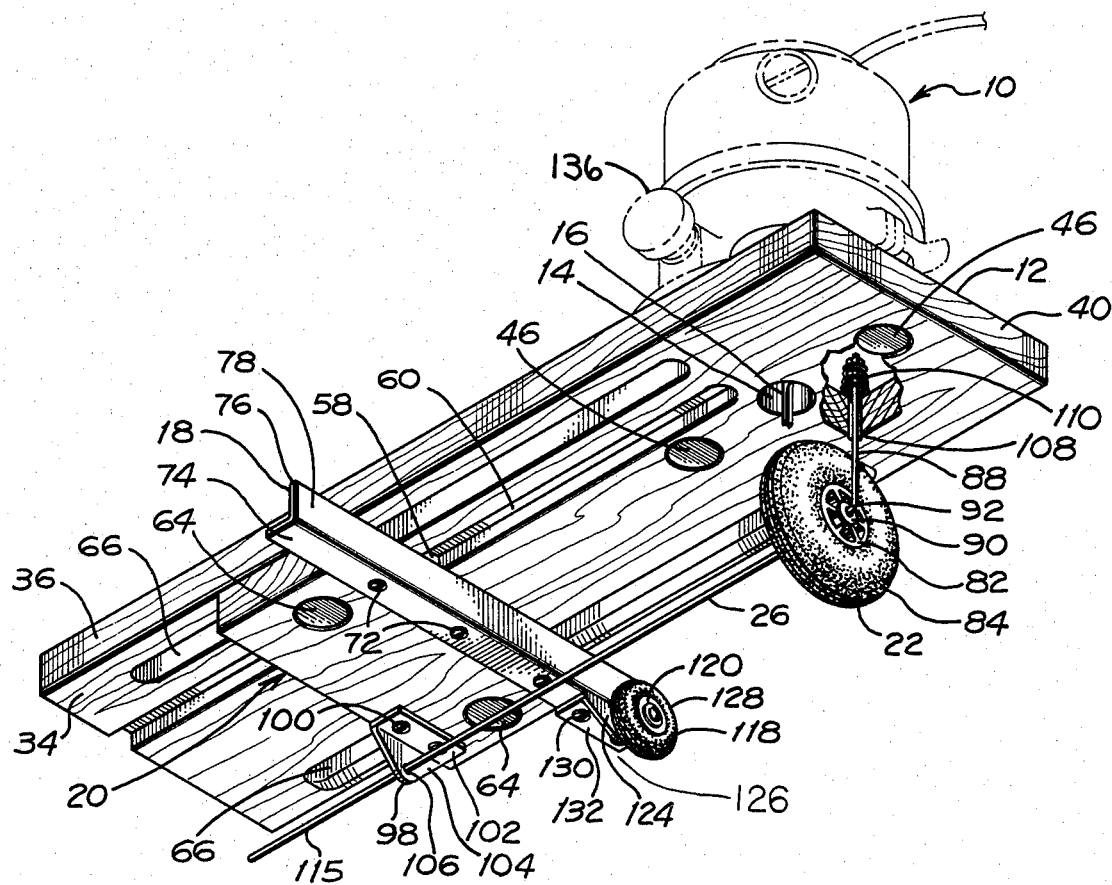
FIG. 1 is a bottom isometric view of one typical embodiment of the present invention with a router shown in phantom.
Figure 2:
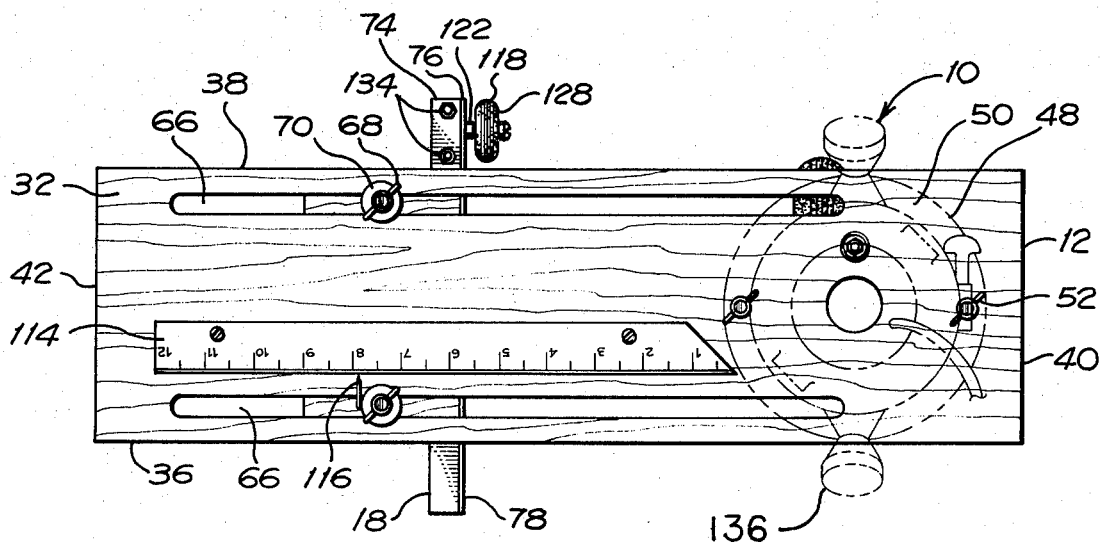
FIG. 2 is a plan view of the typical embodiment of the present invention shown in FIG. 1.
Figure 3:
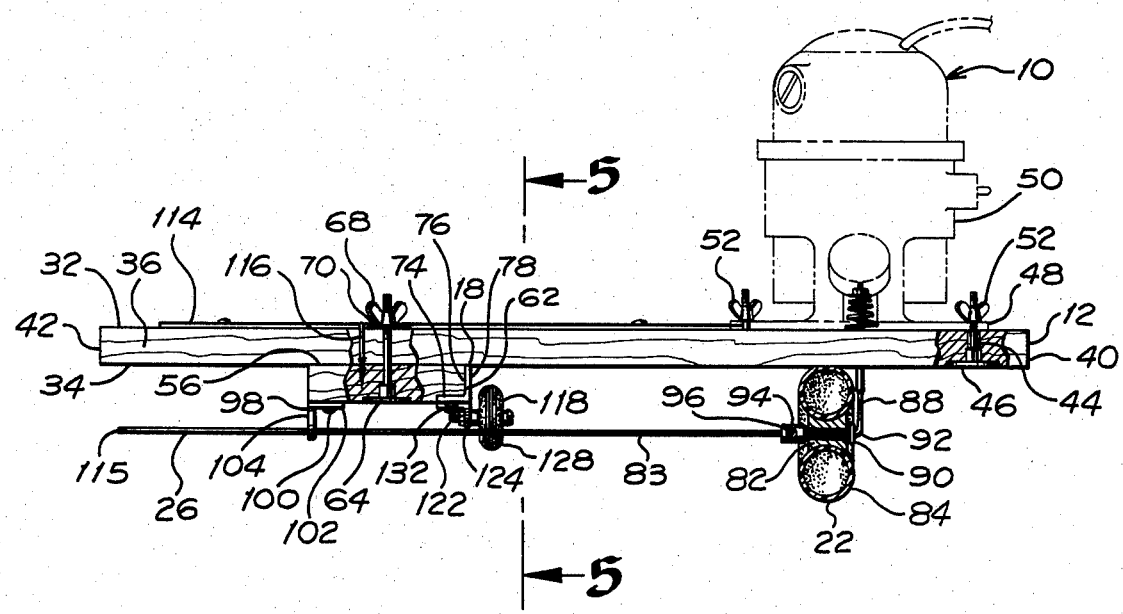
FIG. 3 is a front elevational view of the typical embodiment of the present invention shown in FIG. 2 with portions broken away.
Figure 4:
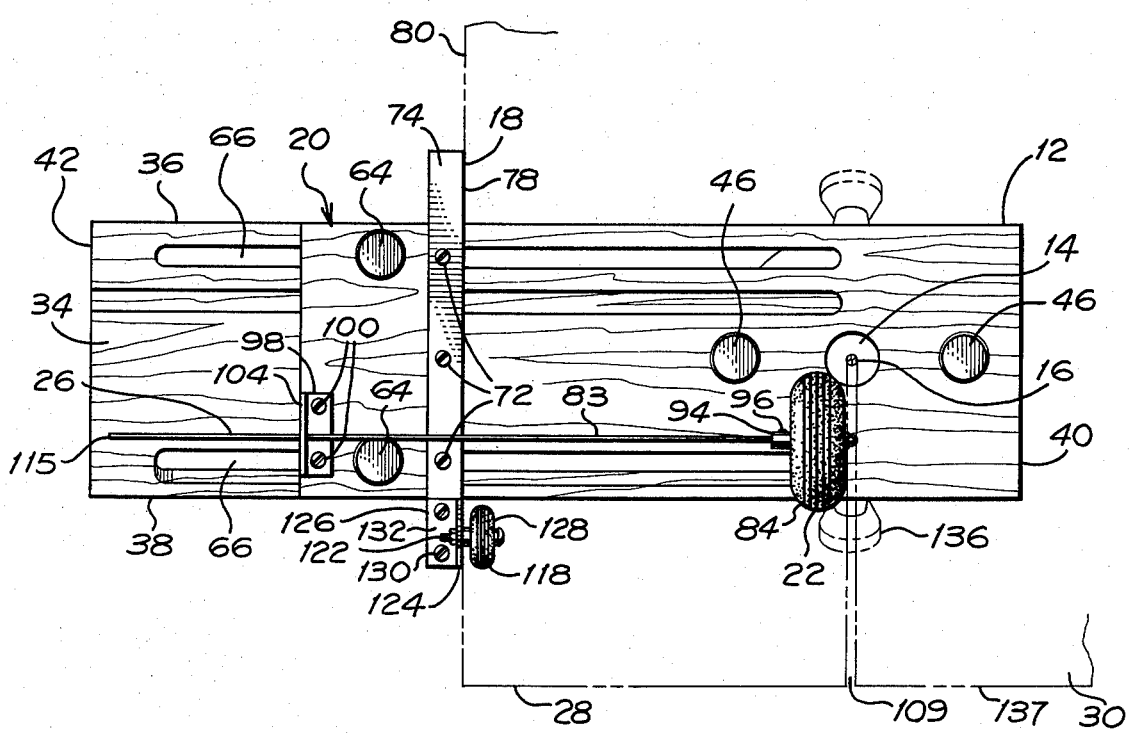
FIG. 4 is a bottom view of the typical embodiment of the present invention shown in FIG. 3.

Referring initially to FIGS. 1–3, a conventional router 10 is shown mounted on a typical embodiment of a cutting guide constructed according to the present invention and which is also the best mode of the invention currently known to applicant. In basic form, the cutting guide is comprised of a manually graspable, elongate base plate 12 having an opening 14 for receiving a cutting tool or bit 16 extending downwardly from router 10. A fence 18, disposed generally transversely to the length of base plate 12, is mounted on carriage 20 for movement along the length of said base plate 12, toward and away from cutting tool 16. Primary and secondary support rollers 22 and 24, respectively, are mounted on an L-shaped axle member 26 for upwardly supporting a strip of material 28 as it is cut from a larger sheet 30 by cutting tool 16.

Now referring specifically to FIGS. 1–4, base plate 12 is constructed in a rectangular, elongate shape having flat upper and lower surfaces 32 and 34, respectively; forward and rear edges 36 and 38, respectively; and manually graspable side edges 40 and 42. A pair of laterally spaced apart, upwardly countersunk holes 44 are provided in the end portion of base plate 12 adjacent edge 40. Holes 44 are located generally centrally between base plate forward and rear edges 36 and 38, respectively. A fastener in the form of flatheaded capscrew 46 is upwardly engageable through each hole 44 to be receivable through aligned holes provided in the flange portion 48 of router mounting base 50. A wing nut 52 is engageable with the threaded upper end portion of each capscrew 46 to thereby securely clamp router mounting base 50 to the upper surface 32 of base plate 12. To prevent strip 28 or sheet 30 from being scratched, the head of capscrew 46 is recessed above the level of base plate lower surface 34.

A vertical tool receiving opening in the form of circular hole 14 is provided in base plate 12 at a location centrally between holes 44. To ensure that base plate 12 does not interfere with cutting tool 16, hole 14 is formed in diameter substantially larger than the diameter of cutting tool 16. As shown best in FIGS. 1 and 3, cutting tool 16 extends downwardly through clearance hole 14 to an elevation below base plate bottom surface 34.

To provide durability during use and economy of fabrication while minimizing the likelihood that it will scratch or mar the plastic laminate being cut, base plate 12 is preferably constructed from wood. Ideally, base plate 12 is constructed from maple which applicant has found to be not only very durable even with rugged use, but also dimensionally stable even in extreme temperatures and humidities.

Now referring to FIGS. 1, and 3–5, carriage 20 includes a flat, rectangular block member 54 disposed directly below and orientated perpendicularly to base plate 12. The length of block member 54 corresponds to the width of base plate 12 so that substantially all of the upper surface 56 of said block member 54 contacts against lower surface 34 of base plate 12. Block member 54 is guided to slide along the length of base plate 12 through the use of an elongate key 58 which extends transversely to the length of said block member and rises upwardly from block upper surface 56 to slidably engage within a downwardly open keyway 60 disposed along the underside of base plate 12. Keyway 60 extends parallel to base plate forward and rear edges 36 and 38, respectively, and substantially along the entire length of base plate 12 from side edge 42 to tool receiving opening 14. Key 58 and keyway 60 ensure that block member 54 remains in the same transverse orientation to the length of forward edge 36 regardless of the location of said block member 54 along the length of said base plate 12. As thusly positioned block member 54 defines a leading edge 62 which faces tool receiving opening 14 and lies perpendicularly to keyway 60.

Figure 5:
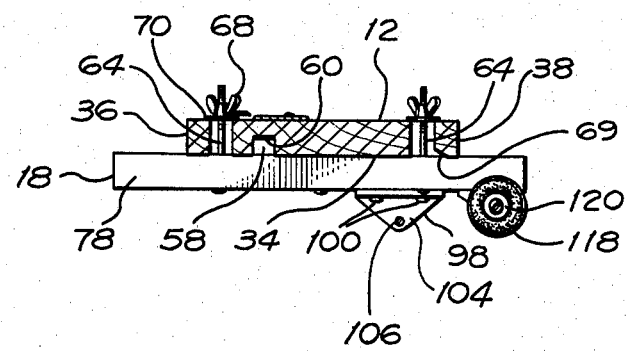
FIG. 5 is a cross-sectional view of the present invention shown in FIG. 3 and taken along lines 5—5 thereof.

Regardless of where block member 54 is positioned along base plate 12, said two members are securely clamped together by spaced apart fasteners, such as flathead capscrews 64, which extend upwardly through counterbored openings provided in each end portion of block member 54 and then through elongate slots 66 formed in base plate 12. A wing nut 68 engages with the threaded upper end of each capscrew 64 to bear downwardly against a flat washer 70 which in turn presses against base plate upper surface 32. Identical elongate slots 66 extend parallel to keyway 60 and are separated by a distance corresponding to the length separating capscrews 64. As best shown in FIG. 5, corner 69 formed by base plate bottom surface 34 and the wall of slot 66 adjacent base plate rear edge 38 is chamfered to avoid catching on the leading edge of strip 28 which may occur if said strip is not flat.

A fence 18 is mounted on block member 54 by fasteners such as screws 72 which extend upwardly through holes provided along the length of horizontal leg 74 of said angle-shaped fence to engage aligned openings provided in the underside of block member 54. The vertical leg 76 of fence 18 overlies the leading edge 62 of block member 54. The outward surface 78 of said vertical leg 76 serves as a guide face against which the edge 80 of strip 28 slides while being cut, FIGS. 4, 5 and 6. To more effectively serve its purpose, fence 18 is constructed in a length long enough to extend forwardly and rearwardly beyond block member 54. Additionally, to minimize wear it is preferable that fence 18 is constructed from noncorrosive, metallic material such as stainless steel or aluminum.

Now referring specifically to FIGS. 1, 3, 4 and 5, a primary support roller 22 is rotatably mounted on an L-shaped axle 26 to support strip 28 upwardly against the bottom surface 34 of base plate 12. Roller 22 includes a hub member 82 rotatably engaged over an elongate, horizontal leg 83 of axle 26, and an outer rim or tire member 84 which makes rolling contact with the underside of strip 28 as it is being cut. Preferably tire member 84 is constructed from a soft, resilient material such as natural or synthetic rubber or urethane. Roller 22 is held in place adjacent the location of axle vertical leg 88 by washer 90 affixed to the portion of axle horizontal leg 83 adjacent axle corner 92 and by collar 94 which is slidably engaged over said axle horizontal leg 83 to lie adjacent the side of hub member 82 opposite washer 90. Collar 94 is held in place by set screw 96 which bears against the outer circumference of axle horizontal leg 83.

Axle horizontal leg 83 is disposed parallel to keyway 60 and perpendicularly to fence guide face 78 so that the line of rolling contact between roller 22 and strip member 28 extends parallel to said fence guide face 78. Also, axle horizontal leg 83 is positioned between tool receiving opening 14 and base plate rear edge 38 so that roller 22 trails behind cutting tool 16 to thereby support the adjacent edge portion of the newly cut strip member 28. Correspondingly, roller 22 is disposed closely along side cutting tool 16 on the side of said cutting tool facing fence 18. Horizontal leg 83 is supported by angle bracket 98 which in turn is mounted to carriage 20. Fasteners, such as screws 100, extend upwardly through spaced openings provided in angle bracket horizontal section 102 to engage into aligned holes provided in the underside of carriage block member 54. The vertical section 104 of angle bracket 98 is provided with a horizontal opening 106 sized to slidably receive axle horizontal leg 83. Axle horizontal leg 83 is of a length sufficient to remain engaged with angle bracket 98 except when carriage 20 is slid as far toward base plate end 42 as possible. When carriage 20 is in this extreme position, axle 26 is free to pivot about its vertical leg 88.

Axle vertical leg 88 extends upwardly from corner 92 and then slidably through a vertical hole 108 provided in base plate 12 to an elevation above base plate upper surface 32. Hole 108 is located behind and aligned with the center of tool receiving opening 14. Preferably axle 26 is formed from spring steel material of a diameter smaller than the diameter of cutting tool 16 so that vertical leg 88 may pass through the kerf 109 cut in sheet 30 by cutting tool 16.

Figure 6:
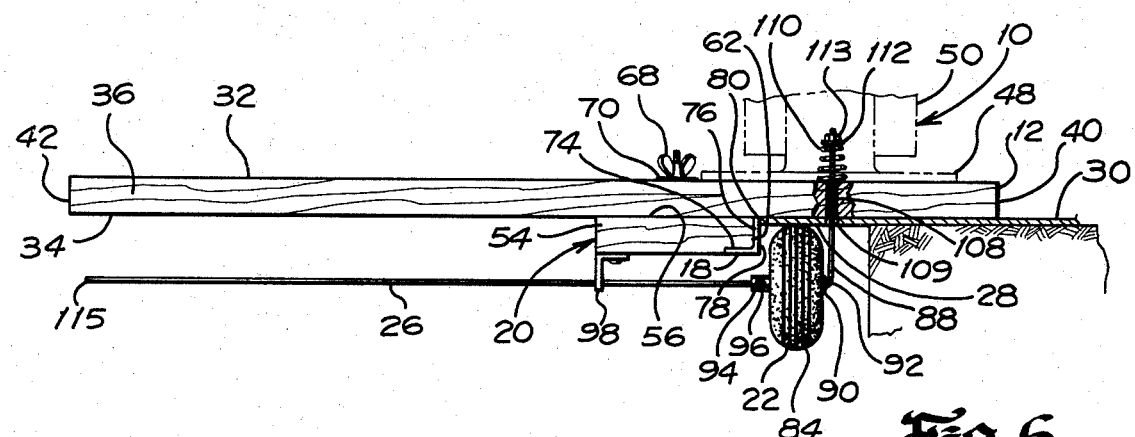
FIG. 6 is a fragmentary front view of a typical embodiment of the present invention with portions broken away and illustrating the use of the present invention to cut a narrow strip of material.
Figure 7:
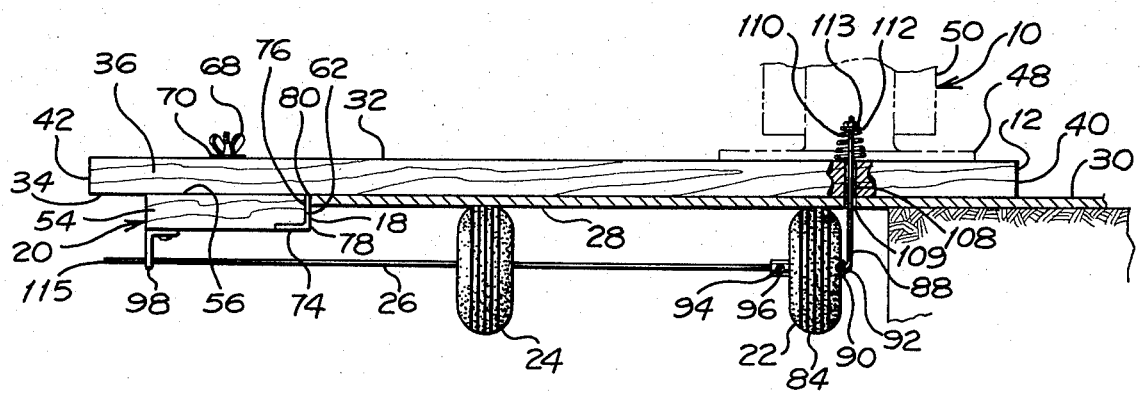
FIG. 7 is a view of the present invention similar to FIG. 6 but illustrating the use of the present invention to cut a relatively wide strip of material.

As best shown in FIGS. 1, 6 and 7, a compression spring 110 engages over the portion of axle vertical leg 88 which extends upwardly above base plate upper surface 32. Compression spring 110 is preloaded by washer 112 and a retainer in the form of nut 113 which engages with the upper end of vertical leg 88 to maintain said compression spring in contact with base plate upper surface 32. Spring 110 serves to bias or urge roller 22 upwardly into contact with base plate lower surface 34 so that strip 28 is held between said two members. Applicant has found that this particular construction minimizes the relative vibration between strip 28 and cutting tool 16 thereby enabling router 10 to precisely and cleanly cut sheet 30. Furthermore, the user does not have to try to support strip 28 by placing his fingers below router mounting base 50 or near cutting tool 16. As a result, the present invention permits sheet 30 to be quickly and conveniently cut into strips 28 while minimizing the possibility that the user will be injured by cutting tool 16.

When cutting a relatively wide strip from material 30, such as strip 28' shown in FIG. 7, a second support roller 24 can be added to axle 26 to support the edge portion of said strip 28' located adjacent to fence 18. To permit second support wheel 24 to be mounted on axle 20, axle horizontal leg 83 is first disengaged from angle bracket 98 by sliding block member 54 as far as possible toward base plate side edge 42 at which location said angle bracket will lie laterally beyond the end 115 of said axle horizontal leg 83. Now axle 26 is free to rotate away from carriage 20 about axle vertical leg 88 so that second support roller 24 can be slidably engaged over axle horizontal leg 83.

As best shown in FIGS. 2 and 3, a graduated scale 114 and corresponding pointer 116 are provided to permit the user to quickly position carriage 20 at the correct location along base plate 12 corresponding to the particular width of strip 28 desired to be cut. More specifically, scale 114 is mounted on base plate upper surface 32 at a location parallel to and slightly rearwardly of the slot 66 which is located adjacent to base plate leading edge 36. For convenience, scale 114 may be graduated in both inch and millimeter increments. The angle shaped pointer 116 extends upwardly from carriage block member 54 through slot 66 to an elevation slightly above base plate upper surface 32 and then rearwardly toward scale 114. The free or rearwardly directed end of pointer 116 is pointed to enable the user to more easily and accurately adjust the position of carriage 20 for a particular width of strip 28 desired.

To also aid in supporting strip 28 upwardly beneath base plate lower surface 34, an auxiliary roller 118 is rotatably axled to the trailing end portion of fence 18 at a location behind base plate rear edge 38. Auxiliary roller 118 includes a hub 120 which is axled on a cantilevered shaft 122 that extends outwardly from the vertical section 124 of bracket 126. Auxiliary roller 118 is disposed parallel to support roller 122 but is positioned at an elevation so that its outer circumference or tire 128 lies slightly below base plate bottom surface 34. Fasteners, such as screws 130, extend upwardly through spaced openings provided in the horizontal section 132 of bracket 126 and then through aligned holes in fence horizontal leg 74 to engage nuts 134. Auxiliary roller 118 serves to vertically support edge 80 of strip 28 so that it remains in sliding contact with fence guide face 78.

To utilize the present invention to cut sheets of material 30 into strips, holes for capscrews 46 must initially be drilled in router base 50. The correct location of these two holes can be easily determined by placing tightly fitting plug (not shown) within tool receiving opening 14 and then sliding cutting tool 16 downwardly through the central bore provided in said plug. The location of base plate holes 44 can now easily be marked on the underside of router mounting base 50 and then corresponding holes drilled through said mounting base 50.

After router base 50 has been bolted to base plate 12, the power unit of router 10 can be attached to base 50 with cutting tool 16 extending downwardly through tool receiving opening 14. Next the particular width of strip 28 to be cut is adjusted by loosening carriage wing nuts 68 and then sliding block member 54 along the length of base plate 12 until pointer 116 is aligned with the proper graduation of scale 114. After the wing nuts are retightened, the present invention can be manually held by grasping router knob 136 with the left hand and base plate side edge 42 with the right hand. Strip 28 can now be conveniently cut by simply placing the base plate forward edge 32 on the top of the rearward edge portion 137 of sheet 30 and then pushing base plate 12 forwardly while maintaining sheet side edge 80 slidably engaged against fence guide face 78. Rather than having to place one's fingers beneath router 10 to prevent strip 28 from vibrating, this is safely accomplished by support roller 22 holding said strip member 28 upwardly against base plate bottom surface 34. Also, even a thin strip can be accurately cut from material 30 since the present invention is held in the same manner no matter how narrow a particular strip is being cut. Although not required, if desired a handle resembling knob 136 (not shown) can be mounted on base plate 12 near side edge 42. Also, it is to be appreciated that the present invention can be used to cut strips from a variety of different materials of varying thicknesses such as plastic laminate, plexiglass, plywood, paneling or particle board.

Furthermore, the present invention can even be adapted to be used in conjunction with power tools other than a router, such as a saber saw or jig saw.

When cutting relatively wide strips, such as strip 28' in FIG. 7, a second primary support roller 24 can be mounted on axle 26 to support the portion of said strip 28' adjacent fence 18. This is accomplished by first loosening carriage wing nuts 68 and then sliding block member 54 toward base plate side edge 42 until axle horizontal leg 83 disengages from angle bracket 98. Axle 26 can then be rotated about vertical leg 88 so that the end axle horizontal leg 83 lies forwardly of base plate 12. Second support roller 22 now can be easily slid onto axle horizontal leg 83 to a location between strip outer edge 80 and first primary support roller 22. Lastly, axle 26 is simply realigned with angle bracket 98 and then carriage 20 positioned along base plate 12 at a location corresponding to the width of strip member 28' desired to be cut.

What is claimed is:

1. A cutting guide for use with a power unit having a powered cutting tool to cut strips of materials from a larger sheet, said cutting guide comprising:
   (a) a manually graspable base plate having an opening for receiving the cutting tool downwardly therethrough;
   (b) means for mounting said power unit on said base plate;
   (c) an elongate fence disposed below said base plate, said fence having a leading and a trailing end portion, and an upright work piece contacting guide face directed toward said base plate tool receiving opening;
   (d) carriage means moveable along the bottom surface of said base plate for securely supporting said fence in selective locations relative to said base plate tool receiving opening; and
   (e) strip support means cooperatively carried by said base plate and said carriage means for supporting the cut strip upwardly against the bottom surface of said base plate, said strip support means comprising:
      a support roller disposed below said base plate at a location rearwardly of said cutting tool receiving opening and laterally between the central axis of said cutting tool receiving opening and said fence;
      axle means for rotatably mounting said roller along an axis extending parallel to the bottom surface of said base plate and perpendicularly to the length of said fence guide face, and
      means fur urging said roller upwardly towards the bottom surface of said base plate.

2. A cutting guide according to claim 1, wherein said axle means includes an elongate first leg having one end portion connected to said base plate at a location adjacent said base plate tool receiving opening and the opposite end supported by and slidably relative to said carriage means.

3. A cutting guide according to claim 2, wherein said urging means includes:
   a hole provided in said base plate at a location aligned with and disposed rearwardly of said tool receiving opening,
   a second axle shaft extending upwardly from said first shaft on the side of said roller opposite said fence, said second axle shaft being slidably receivable through said hole, and
   spring means for biasing said second shaft in an upwardly direction.

4. A cutting guide according to claim 1, further comprising a second support roller rotatably mounted on said axle means at a location between said first support roller and said fence.

5. A cutting guide according to claim 1, wherein said roller includes a resilient outer rim.

6. A cutting guide for use with a power unit having a powered cutting tool to cut strips of materials from a larger sheet, said cutting guide comprising:
   (a) a manually graspable base plate having an opening for receiving the cutting tool downwardly therethrough;
   (b) means for mounting said power unit on said base plate;
   (c) an elongate fence disposed below said base plate, said fence having a leading and a trailing end portion, and an upright work piece contacting guide face directed toward said base plate tool receiving opening;
   (d) carriage means moveable along the bottom surface of said base plate for securely supporting said fence in selective locations relative to said base plate tool receiving opening; and
   (e) strip support means cooperatively carried by said base plate and said carriage means for supporting the cut strip upwardly against the bottom surface of said base plate, said strip support means comprising:
      a generally L-shaped axle having one end portion supported by said base plate and the other end portion supported by said carriage means, said axle having a vertical leg extending downwardly from said base plate a location rearwardly of and aligned with the central axis of said base plate tool opening to intersect a horizontal leg, said horizontal leg extending from the lower end of said vertical leg along a line generally parallel to the bottom surface of said base and generally perpendicularly to said fence guide face to slidably engage with said carriage means, and
      support roller means rotatably mounted on said axle horizontal leg at a location adjacent said vertical leg.

7. A cutting guide according to claim 6, wherein said strip support means further comprises means for urging said roller means upwardly towards the bottom surface of said base plate.

8. A cutting guide according to claim 7, wherein said roller urging means comprises:
   a hole provided in said base plate aligned rearwardly of said tool receiving opening for slidably receiving said axle vertical leg, and
   spring means for maintaining said axle vertical leg upwardly engaged within said hole.

9. In a cutting guide for use with a power unit having a powered cutting tool to cut strips of material from a larger sheet, the cutting guide including a manually graspable base plate having an opening for receiving the cutting tool downwardly therethrough and means for mounting the power unit on the base plate, the improvement comprising:
   upwardly biased strip support means partially carried by the base plate for supporting a cut strip of material in upward contact against the bottom surface of the base plate;

an elongate fence positioned below the base plate, said fence having a leading and trailing end portion, and a work piece contacting guide face extending downwardly from the bottom surface of the base plate and being directed toward said tool receiving opening, said guide face serving to slide against the side of the strip of material to be cut that is disposed opposite to the side adjacent the cutting tool; and carriage means longitudinally slidable along the underside of the base plate toward and away from said tool receiving opening for securely supporting said fence in selective locations relative to said tool receiving opening, said carriage means including means cooperating with said base member to carry said strip support means while enabling the distance separating said fence and said tool receiving opening to be selectively varied.

10. The improvement according to claim 9, further comprising:

wherein said carriage means includes a block member having an upper surface bearing against the bottom surface of the base plate and a side edge portion directed toward said tool receiving opening for mounting said fence therealong at an orientation generally transverse to the length of the base plate;

securing means for securely maintaining said block member in selective locations against the bottom surface of the base plate, said securing means including a pair of spaced, parallel, elongate slots extending vertically through and along a substantial length of the base plate and fastener means extending upwardly from said block member through each of said slots to bear against the upper face of the base plate to clamp said block member and the base plate together; and guide means for guiding said carriage means for translation along the length of the base plate.

11. The improvement according to claim 10, wherein said guide means comprises:

an elongate, downwardly open keyway extending longitudinally of and along the bottom surface of the base plate; and an elongate key extending upwardly from said carriage means block member for slidably engaging with said keyway, said key being disposed downwardly perpendicularly relative to the length of said fence guide face.

* * * * *